United States Patent [19]

Kodera

[11] Patent Number: 4,802,512
[45] Date of Patent: Feb. 7, 1989

[54] AUTOMATIC WIRE DECORTICATING AND CUTTING METHOD AND APPARATUS

[75] Inventor: Hiroji Kodera, Gifu, Japan

[73] Assignee: Kabushiki, Kaisha, Kodera, Denshi, Seisakusho, Gifu, Japan

[21] Appl. No.: 18,393

[22] Filed: Feb. 24, 1987

[30] Foreign Application Priority Data

Feb. 25, 1986 [JP] Japan .................................. 61-39434
Feb. 25, 1986 [JP] Japan .................................. 61-39435

[51] Int. Cl.$^4$ ............................................. B21F 07/00
[52] U.S. Cl. .................................... 140/149; 81/9.51; 29/564.4
[58] Field of Search ......................... 140/149; 81/9.51; 29/564.4

[56] References Cited

U.S. PATENT DOCUMENTS

| | | | |
|---|---|---|---|
| 4,009,738 | 3/1977 | Baba et al. ........................... | 140/149 |
| 4,506,566 | 3/1985 | Schmid ................................ | 81/9.51 |
| 4,631,823 | 3/1984 | Collier et al. . | |
| 4,719,697 | 6/1986 | Schwartzman et al. . | |

FOREIGN PATENT DOCUMENTS

| | | | |
|---|---|---|---|
| 31432 | 2/1982 | Japan .................................. | 140/149 |
| 60-204206 | 10/1985 | Japan . | |
| 61-273113 | 12/1986 | Japan . | |
| 61-273114 | 12/1986 | Japan . | |

*Primary Examiner*—Lowell A. Larson
*Attorney, Agent, or Firm*—Michael D. Rechtin; Philip P. Mann

[57] ABSTRACT

The present invention relates to an automatic covered wire cutting and decorticating apparatus and process for moving forward the covered wire by a specified length to a side unopposed to a sending mechanism of a cutting mechanism provided at a position opposite the sending mechanism. A pair of rollers of the sending mechanism moves the covered wire and a cover of the covered wire is cut by the cutting mechanism. The apparatus further processes the wire by pulling the covered wire to the sending mechanism and decorticating the cover of covered wire by rotating both the rollers of the sending mechanism and a process for twisting an exposed core wire by relatively moving both the rollers of the sending mechanism in the direction of axial center in synchronization with the process for decorticating the cover of the covered wire.

15 Claims, 6 Drawing Sheets

AUTOMATIC WIRE DECORTICATING AND CUTTING METHOD AND APPARATUS

FIELD OF THE INVENTION

The present invention relates to an automatic wire cutting and decorticating method and apparatus for covered wires to be used for a variety of electrical appliances.

DESCRIPTION OF THE RELATED ART

Figure 14:
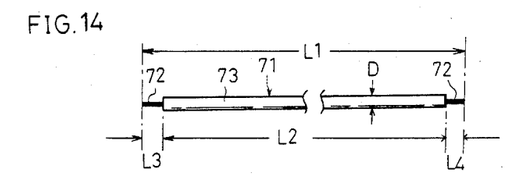

A covered wire for electronic and electric appliances is generally used through the processes described as follows. Namely, as illustrated in FIG. 14, the covered wire 71 is manufactured in designated sizes such that the length is L1, thickness is D, length of cover 73 is L2, decortication lengths of core wire are L3 and L4.

Figure 15:
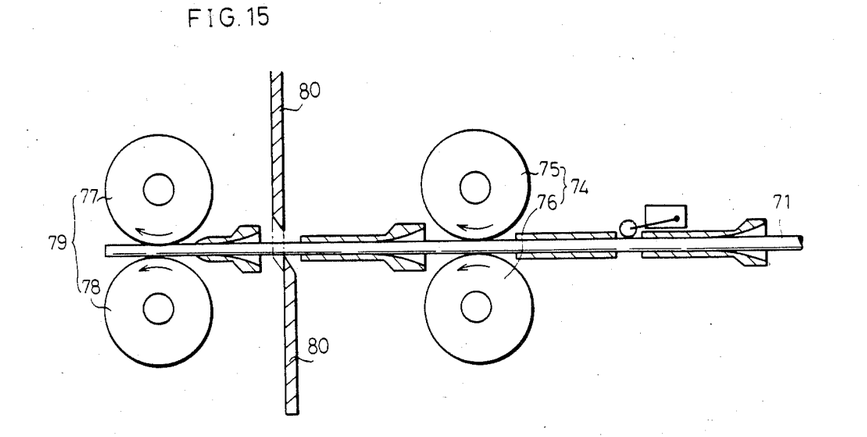
FIG. 15 is a schematic diagram illustrating an apparatus of related art.

As a consequence of the increase in demand and diversification of electronic and electric appliances in recent years, the Applicant of the present invention proposes the automatic wire cutting and decorticating apparatus (Japanese Unexamined Laid-open Patent No. 60-204206) as illustrated in FIG. 15. The subject apparatus is used for cutting and decorticating the covered wire 71 described previously.

Namely, the apparatus comprises a sending/pulling mechanism 74 which includes a pair of rollers 75, 76 for sending and pulling the covered wire 71 through reversible rotation, a take-out/resending mechanism 79 which includes a pair of rollers 77, 78 for taking out and resending the covered wire 71 through reversible rotation, a cutting mechanism 80 which is provided between both these mechanisms 74, 79 and cuts the covered wire 71 and decorticates the cover. The apparatus also includes an operation control mechanism (not illustrated) which includes a computer for controlling operations of said mechanisms.

This apparatus is formed with comparatively simplified structure; and therefore, the apparatus itself can be made compact and can improve working efficiency and accordingly it can be used widely. However, this automatic wire cutting and decorticating apparatus cannot cover the processes up to the twisting work of said core wire 72, and it has been performed manually by an operator. Moreover, the covered wire 71 has been cut and decorticated by said apparatus in such processes that the covered wire 71 is reciprocally moved in the forward and backward (right and left in FIG. 15) directions through the reversible rotations of said sending-/pulling mechanism 74 and take-out/resending mechanism 79. The wire is thus decorticated through the cutting and cut-off using said cutting mechanism 80.

However, use of this automatic wire cutting/decorticating apparatus requires that the covered wire 71 is reciprocally moved between said sending/pulling mechanism 74 and take-out/resending mechanism 79. In particular, for decortication of the rear end side of the covered wire 7 which has been cut, the covered wire must be moved backward relative to the cutting mechanism 80 and therefore the next covered wire 71 arranged in said sending/pulling mechanism 74 is located on the locus of backward movement of the forward covered wire 71 which has been cut. This operation interferes with the decortication work for the rear end side thereof. Therefore, in order to prevent such disadvantages, the rollers 75, 76 of the sending/pulling mechanism 74 are, each time, rotated reversely in order to move backward the next covered wire 71, once the covered wire 71 is moved backward, then it is sent again to the initial position. As a result, additional time is required and working efficiency is quite poor.

SUMMARY OF THE INVENTION

It is accordingly an object of the present invention to provide an automatic wire cutting and decorticating method and apparatus which not only can easily cut and decorticate a covered wire but also can twist automatically the covered wire and moreover can improve the working efficiency.

It is another object of the present invention to provide an automatic wire cutting and decorticating method and apparatus which eliminates the phenomenon that the covered wire to be cut and decorticated next interferes with the decorticating work to the rear end side of covered wire having been cut.

It is a further object of the present invention to provide an automatic wire cutting and decorticating method and apparatus which do not require backward movement of the covered wire and further improves the working efficiency.

In order to achieve the objects described previously, the present invention comprises, at least the following features generally:

(1) a process for making a covered wire for the specified length for the side not opposed to the sending means of the cutting means, provided at the position opposed to the sending means, by rotating both rollers of at least one sending means having a pair of rollers, (2) a process for cutting the cover of covered wire with a cutting means, (3) a process for decorticating the cover of the covered wire by pulling the covered wire toward the sending means through rotations of both rollers of the sending means, and (4) a process for twisting exposed core wire by relatively moving both rollers of sending means along the axial center direction in synchronization with said process for decorticating the cover of the covered wire.

The other objects of the present invention will become apparent from sufficient understanding of the preferred embodiments described hereinafter and will be defined clearly in the appended claims thereof, and the present invention will demonstrate to those who are skilled in this art of a variety of advantages as set forth herein.

BRIEF DESCRIPTION OF THE DRAWINGS

FIG. 1 to FIG. 13 illustrate embodiments of the present invention.

FIGS. 9, 10 and 11 are schematic diagrams illustrating the cutting, decorticating and twisting processes of covered wire.

FIGS. 14 and 15 are related art examples, where FIG. 14 is a front elevation illustrating a covered wire, while

DETAILED DESCRIPTION OF THE PREFERRED EMBODIMENT

A preferred embodiment of the present invention will be described subsequently with reference to FIGS. 1–13. A covered wire which has been cut, decorticated and twisted by the method and apparatus of the present invention will be explained.

Figure 13:
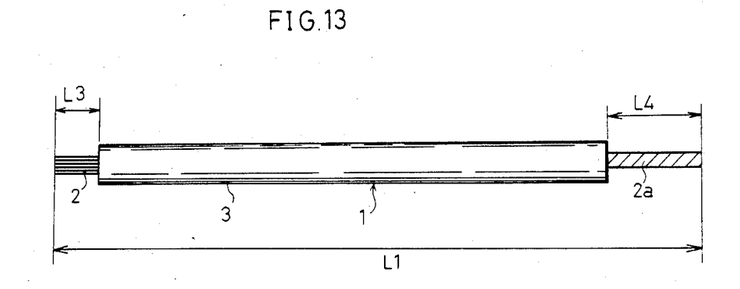
FIG. 13 is a front elevation illustrating covered wire manufactured by the apparatus of the present invention.

As illustrated in FIG. 13, the covered wire 13 is formed by a core wire 2 and cover 3 provided around the wire. The cover 3 is decorticated for the specified length at both ends of said covered wire. Moreover, said covered wire 1 is formed of a total length of L1, the decorticated portions are sent in length of L3 at the front end side while in length of L4 at the rear end side. The decorticated portion in the front end side is shorter than the decorticated portion in the rear end side. In addition, the exposed core wire 2a at the decorticated part of the rear end side is twisted.

Figure 1:
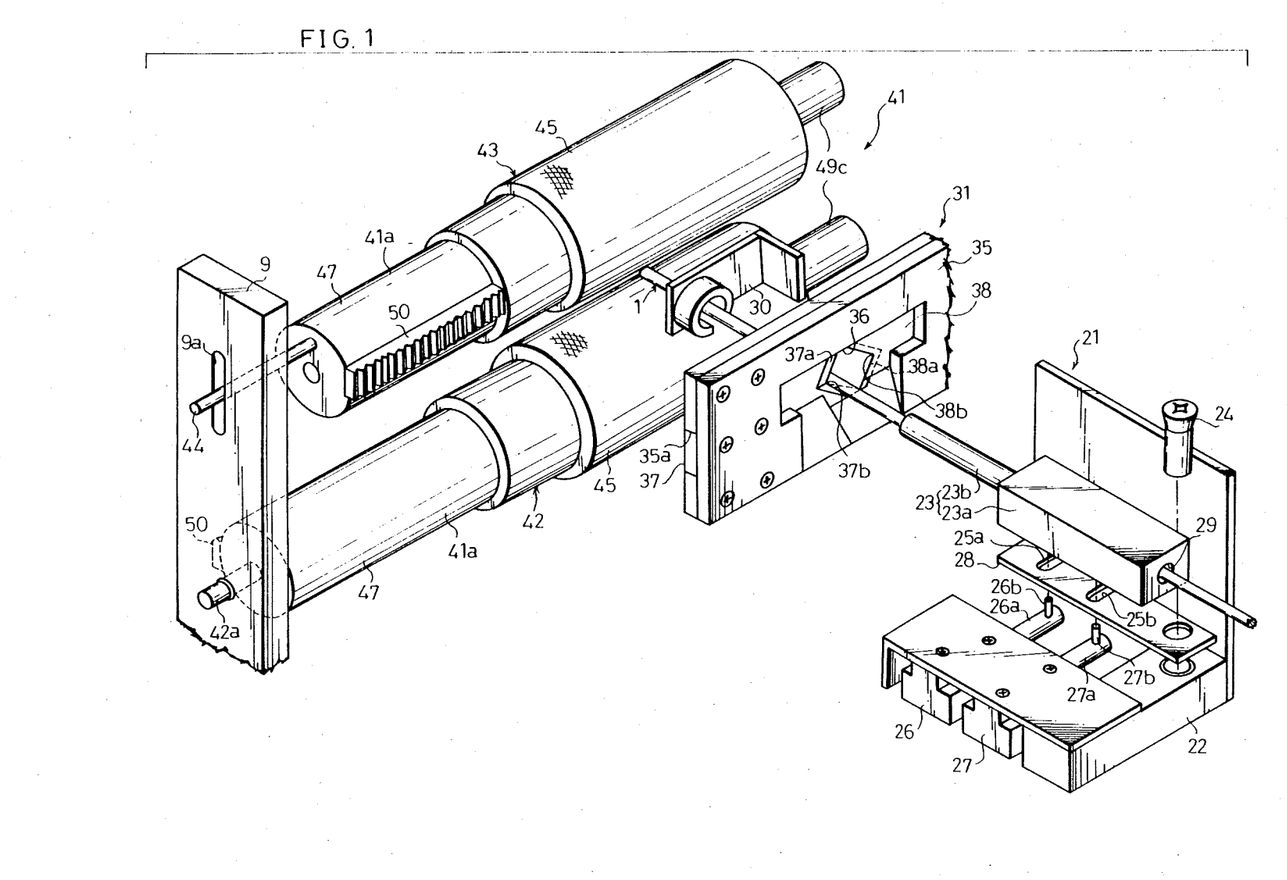
FIG. 1 is a perspective view of one illustration of an apparatus of the present invention.
Figure 9:
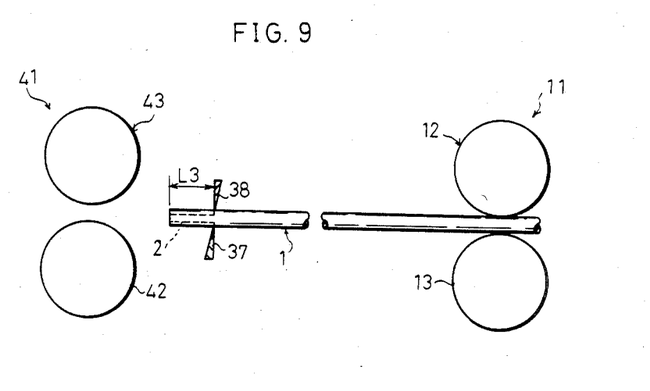
FIG. 9 is a schematic side elevation illustrating the decorticating function for the front end side of the covered wire.
Figure 10:
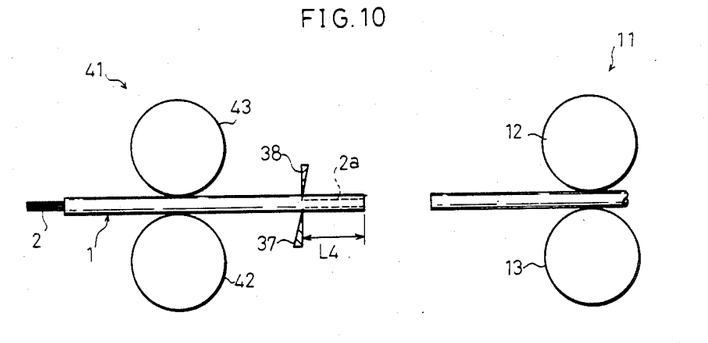
FIG. 10 is a schematic side elevation illustrating the decorticating work for the rear end side of the covered wire.
Figure 12:
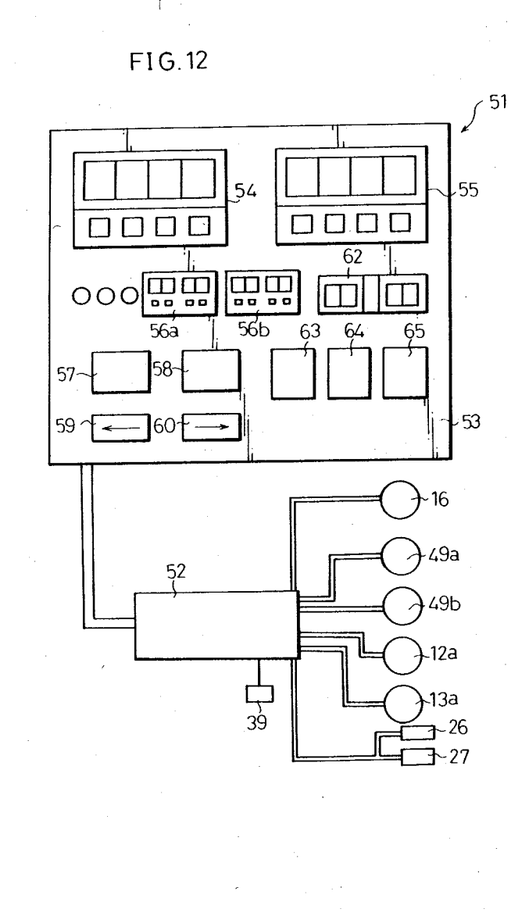
FIG. 12 is a front elevation illustrating the operation control apparatus.

Next, the wire cutting, decorticating and twisting apparatus of the present invention will be described. As illustrated in FIGS. 9 and 10, this apparatus mainly comprises a sending/pulling mechanism 11 which includes a pair of rollers 12, 13 for sending and pulling a continuous covered wire 1 through a reversible rotation cycle, by means of a guiding mechanism 21 which is provided in front of both rollers 12, 13. The mechanism 21 guides said covered wire 1 to the next mechanism as illustrated in FIG. 1. A cutting mechanism 31 is provided in front of said guiding mechanism 21 for cutting off the wire 1 and cutting the cover 3. A take-out/-resending mechanism 41 and twisting mechanism 41a are provided in front of said cutting mechanism 31 and includes a pair of rollers 42 and 43 which take-out and resend said covered wire 1 and simultaneously move relatively in the axial direction. Also included is an operation control unit 51 which includes a computer 52 for controlling operations of said mechanisms 11, 21, 31, 41 and 41a as illustrated in FIG. 12.

Figure 2:
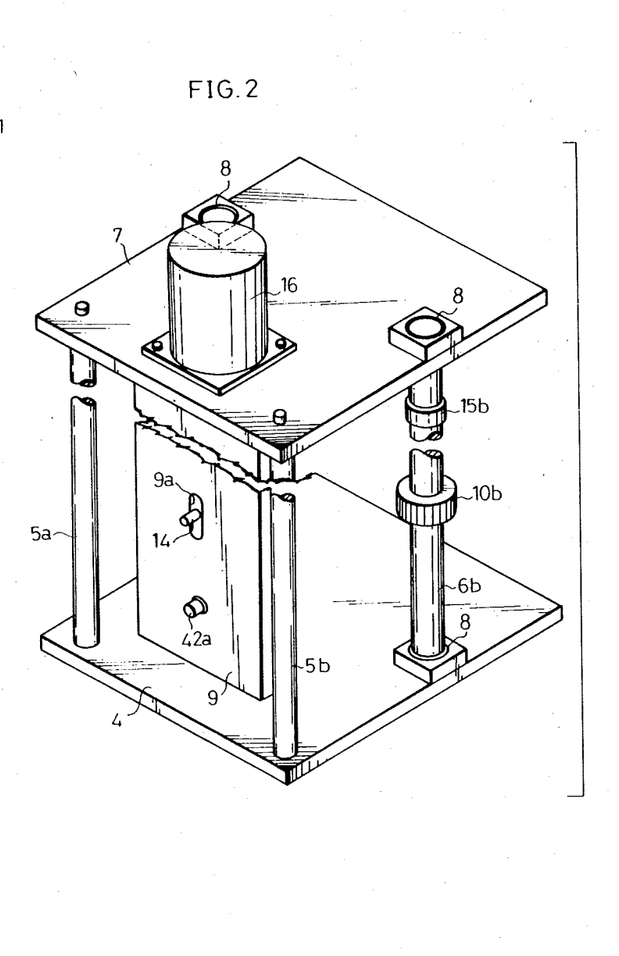
FIG. 2 is a partly omitted perspective view illustrating the upper and lower fitting plates of an apparatus of the present invention.

This apparatus will now be explained in terms of each mechanism. As illustrated in FIG. 2, a total of four support rods 5a, 5b, 6a (illustrated only in FIG. 4), 6b are erected and fixed at the four corners of the upper surface of the lower fitting plate 4, and the upper fitting plate 7 is supported and fixed at the upper side of said rods. The forward two support rods 5a, 5b among said support rods 5a, 5b, 6a, 6b are non-rotatably fixed to said fitting plates 4, 7, while the backward two support rods 6a, 6b are rotatably attached through a bearing 8.

Sending/Pulling Mechanism

A pair of upper and lower rollers 12, 13 (illustrated only in FIGS. 9 and 10) are rotatably supported in the mutually opposed directions. The covered wire 1 is sent or pulled to/from the guiding mechanism 21 (described below) followed by rotations of such rollers. In addition, said rollers 12, 13 are respectively rotated in both reversible directions (sending or pulling directions for covered wire 1) by pulse motors 12a, 13a and said pulse motors 12a, 13a are controlled for the operating conditions thereof with a computer described hereinafter.

Guiding Mechanism

A frame 22 is provided in front of said sending/pulling mechanism 11 as illustrated in FIG. 1. A guiding member 23 is pivotally provided at the upper surface of said frame 22 with a bolt 24 through a plate type regulation member 28 so that it can rotate horizontally. Said guiding member 23 is formed by the main body 23a which is rectangular in shape and is provided with a through hole 29 and a guiding tube 23b which has a hole (not illustrated) to be connected with said through hole 29. The guiding member 23 is always held at the position indicated by a solid line in FIG. 8 by a conventional energizing means not illustrated.

Figure 6:
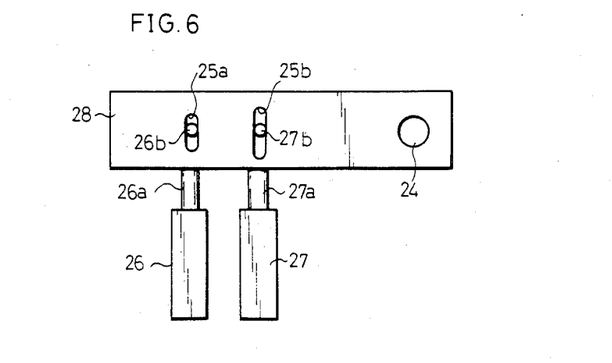
FIG. 6 is a schematic plan view illustrating an inclined moving mechanism of a guiding apparatus.
Figure 8:
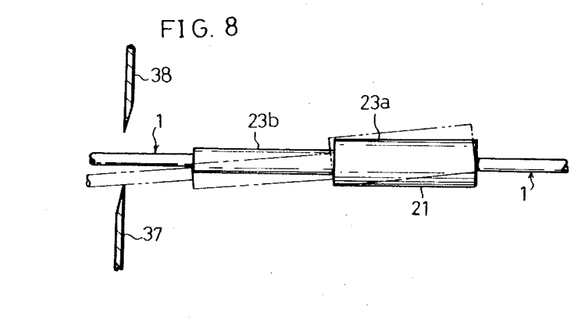
FIG. 8 is a plan view illustrating the inclined moving condition of the guiding member during cutting and initial access to the covered wire.
Figure 11:
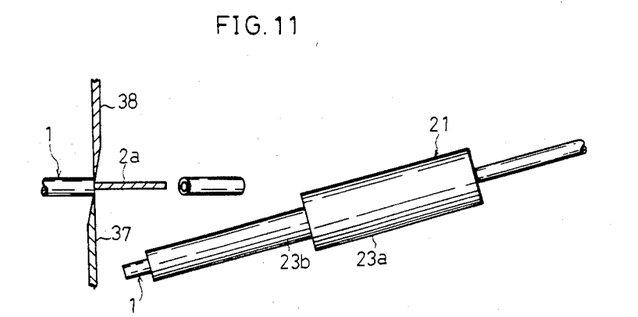
FIG. 11 is a schematic plan view illustrating the decorticating and twisting condition of the rear end side of the covered wire.

As illustrated in FIG. 6, said regulating member 28 is provided with elliptical slots 25a, 25b. The engaging protrusions 26b, 27b attached to the movable iron cores 26a, 27a of a pair of solenoids 26, 27 coupled to the frame 22 are inserted into the slots 25a, 25b. These slots are different in length and therefore when either one of two solenoids 26, 27 moves, the rotating angle in the horizontal direction of said guiding member 23 is also controlled. In addition, these slots 25a, 25b are formed in such lengths as not to be interfered with by the engaging protrusion 26b, 27b of the other solenoid 26, 27 when the one solenoid 26, 27 operates. Said guiding member 23 maintains, when sending or pulling the covered wire 1, the non-rotating position, namely regular covered wire transfer position. As illustrated in FIG. 8, energizing means operates to position the covered wire 1 at the intermediate position of the fixed cutting blade 37 and movable cutting blade 38 without any contact with them. Moreover, at the time of cutting, the solenoid 27 operates and its engaging protrusion 27b presses the end part of slot 25b. Thereby, the guiding member 23 rotates, as illustrated by the chain line of FIG. 8, until the covered wire 1 is in contact with the blade part 37a of said fixed cutting blade 37, maintaining the cutting position of covered wire. Further, when the covered wire 1 is to be resent and decorticated, the solenoid 26 operates and its engaging protrusion 26b presses the end part of slot 25a. Thereby, the guiding member 23 maintains, as illustrated in FIG. 11, the covered wire 1 to be resent backward at the rotating position, namely at the position outside of the locus of backward moving of covered wire. Consequently, the covered wire to be resent backward does not collide with the covered wire 1 to be exposed from the guiding tube 23b and the end part of guiding tube 23b.

The solenoids 26, 27 are controlled for the operation by a computer described later.

Cutting Mechanism

As illustrated in FIG. 1, a case (not illustrated) in front of said guiding mechanism 21 supports vertically a fitting plate 35 having an aperture 36 at the one end thereof and the housing groove 35a is formed at the rear surface thereof and the housing groove 35a is formed at the rear surface thereof. The fixed cutting blade 37 is housed and fixed to said housing groove 35a and a V-shaped blade 37A having the recessed part 37b is formed at the end part of said cutting blade 37.

In addition, the movable cutting blade 38 is supported by the housing groove 35a at the part opposed to said fixed cutting blade 37 in such a manner that it can perform reciprocal movement in the direction as it approaches selected distances from the fixed cutting blade by means of the drive unit 39 (illustrated only in FIG. 12). The V-shaped blade part 38a having the recessed part 38b is formed at the end part of the movable cutting blade 38.

Said movable cutting blade 38 makes the reciprocal movement under the control of a computer described later and cuts off said covered wire or cuts the cover 3 between the recessed portions 37b, 38b of both blades 37, 38 in cooperation with said fixed cutting blade 37.

Take-Out/Resending Mechanism, Twisting Mechanism

As illustrated in FIG. 2, a flat type bearing member 9 is erected almost at the center of said lower fitting plate 4 and its upper surface is fixed to said upper fitting plate 7. As illustrated in FIG. 1, an ellipse cut-away groove 9a is formed at the upper part of said bearing member 9. A lower roller 42 is rotatably attached to the shaft 42a through a bearing (not illustrated) to the lower part of said bearing member 9. An upper roller 43 is rotatably fitted and is movable in the vertical direction relative to the upper part of the bearing member 9 by inserting an engaging pin 44 of upper roller 43 within the cut-away groove 9a.

Figure 3:
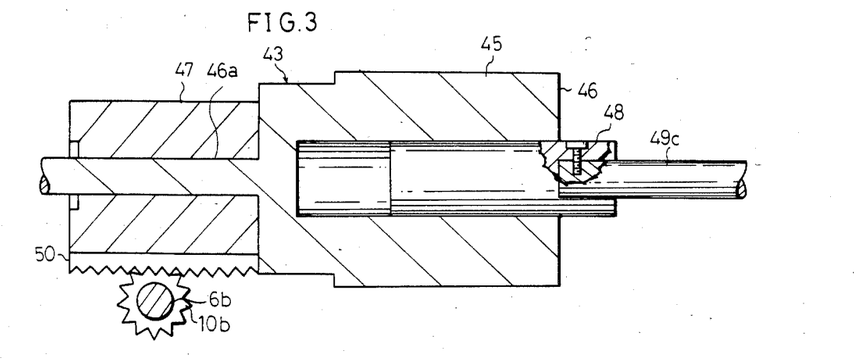
FIG. 3 is a sectional view of a center part of the invention illustrating the take-out and resending rollers which also have a twisting function.
Figure 5:
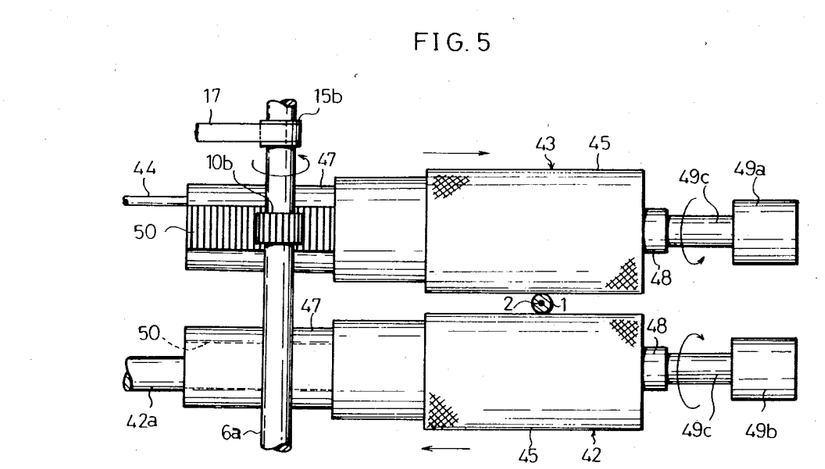
FIG. 5 is a front elevation of FIG. 4.

Moreover, as illustrated in FIG. 3, said upper and lower rollers 42, 43 are composed of a main body 46 which has the knurled part 45 which is in contact with said covered wire 1 at the surface thereof, a moving member 47 which is loaded to a small diameter part 46a in the left side and is not rotated by itself but relatively revolves to said main body 46, and a drive shaft 48 which is spline-engaged with the inside of said main body 46. Each drive shaft 48 of the upper and lower rollers 42, 43 is coupled with an output shaft 49c of the pulse motors 49a, 49b as illustrated in FIG. 5. Both of these main bodies 46 of the upper and lower rollers 43, 42 are reversibly rotated (in the direction for taking out and resending the covered wire 1) by rotation of said pulse motors 49a, 49b.

Figure 4:
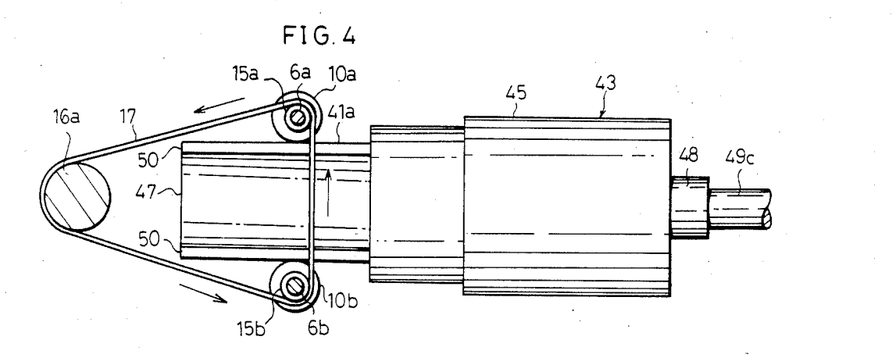
FIG. 4 is a plan view of the take-out/resending and twisting mechanisms.

A rack 50 is respectively fixed by a screw (not illustrated) to the side surface opposed to the cutting means 31 of the moving member 47 of said upper roller 43 and the side surface not opposed to the cutting means of the moving member 47 of the lower roller 42. The rack 50 of upper roller 43 is engaged with the pinion 10b provided to said rear supporting rod 6b, while the rack of the lower roller 42 is engaged with the pinion 10a provided to the rear supporting rod 6a, respectively. Moreover, as illustrated in FIG. 4 and FIG. 5, said supporting rods 6a, 6b are provided with the timing pulleys 15a, 15b located above the pinions 10a, 10b. As illustrated in FIG. 2, a pulse motor 16, which can reversibly rotate, is provided to the upper fitting plate 7. Also as illustrated in FIG. 4, a timing belt 17 is extended over the timing pulley 16a provided to the output shaft (not illustrated) of the same motor 16 and both of the pulleys 15a, 15b.

When, the pulse motor 16 rotates, the timing belt 17 rotates in the direction of the arrow shown in FIG. 4, causing rotation of each supporting rod 6a, 6b and pinion 10a, 10b provided to a part of such rod. Rotations of such elements cause both racks 50 and moving members 47 of upper and lower rollers 43, 42 to move in opposite direction of the thrust direction of the main body 46. Moreover, both moving members 47 are moved in the opposite directions of the thrust direction as described previously under the condition that said lower and upper rollers 42, 43 are rotated by said pulse motors 49a, 49b in the winding direction indicated by the arrow mark of FIG. 5, namely in the direction of taking out the covered wire 1. As a consequence of this opposite movement, the covered wire 1 held between rollers 46 is taken out and simultaneously twisted.

The pulse motors 49a, 49b, 16 are respectively connected with a computer described subsequently and are controlled for reversible rotation in accordance with the commands send from the computer.

The transfer tube 30 is also arranged for guiding the covered wire 1 to the rollers 42, 43 between said cutting mechanism 31 and the take-out/resending mechanism 41 and the twisting mechanism 41a.

Operation Control Apparatus

As illustrated in FIG. 12, said pulse motors 16, 49a, 49b, 12a, 13a, solenoids 26a, 26b and drive unit 39 are respectively connected with the computer 52 through the lead wires W. This computer 52 is also connected to an operation box 53 through the lead wire W.

At the surface of the operation box 53, a digit switch type length setting display unit 54 is provided to set and display the cutting length L1 of the covered wire 1. At the right side of said length setting and display unit 54, a digit switch type wire number setting and display unit 55 is provided to set and display a number of wires to be cut of the covered wire 1. At almost the center of the operation box 53, a front end and rear end decortication length setting and display units 56a, 56b are provided to set the exposed lengths L3, L4 of the core wire 2 at both front and rear ends of the covered wire 1 which has been cut.

At the lower side of operation box 53, a start switch 57, a stop switch 58, a send switch 59 and resend switch 60 are respectively provided. Additionally provided are a wire number display unit 62 for displaying the number of covered wires 1 having been cut, a switch 63 and a reset switch 64 for starting the display operation of said wire number display unit 62 and a switch 65 for calculating a counted value when a cutting mistake occurs.

The automatic cutting and decorticating method utilizing the automatic cutting, decorticating and twisting units thus constituted will now be described with reference to FIGS. 1, 5, and 7 to 12.

First, the covered wire 1 wound to a drum (not illustrated) is taken out prior to the cutting, decorticating and twisting operations on the covered wire 1. The send switch 59 is turned ON in order to introduce the covered wire 1 between the rollers 12, 13 of said sending-/pulling mechanism 11 and also insert the wire to the main body 23a and guide tube 23b of said guiding mechanism 21. Furthermore, the covered wire 1 is shifted between the fixed and movable cutting blades 37, 38. When the end part of covered wire 1 is moved to the desired position slightly protruded from the cutting blades 37, 38, the send switch is turned OFF in order to stop the rollers 12, 13. With this timing, a limit switch (not illustrated) is provided between said rollers 12, 13; and the guiding mechanism 21 measures the length of movement of said covered wire 1 and inputs said moving length to said computer.

Under this operating condition, the cutting length L1 of the covered wire 1 to be cut is set by operating the length setting and display unit 54, and then the number of wires to be cut is set by operating a cutting wire number setting and display unit 55. Moreover, the decortication lengths L3, L4 of cover 3 are sent respectively by operating the front end and rear end side cover length setting and display units 56a, 56b. When the start switch 57 is turned ON under this condition, the covered wire 1 is automatically cut, decorticated and twisted in the following manner.

As, illustrated in FIG. 9, said covered wire 1 is fixed to the present position by the rotations of said rollers 12, 13, the movable cutting blade 38 shifts in the direction close to the fixed cutting blade by means of said drive unit 39 and said movable cutting blade 38 cuts the cover 3 of covered wire 1 in cooperation with said fixed cutting blade 37. At this time, said guiding mechanism 21 rotates said guiding tube 23b to the covered wire cutting position in conjunction with the operation of the movable cutting blade 38 and thereby, as indicated by the chain line of FIG. 8, the side surface of covered wire 1 is placed in contact with the recessed part 37b of the blade part 37a of the fixed cutting blade 37. Accordingly, the covered wire 1 is cut under the condition that it is extended on the same line as the guiding mechanism 21, main body 23 and the guiding tube 23b. In other words, one can avoid the covered wire 1 being cut while it is bent at the front end part of the guiding tube 23b. The cover L3 of said end part is decorticated by cutting the cover of the covered wire 1 and pulling the covered wire 1 through reverse rotation of said rollers 12, 13.

Next, the guiding tube 23b is returned nearly to the intermediate location between the fixed cutting blade 37 and the movable cutting blade 38, namely to the covered wire moving position. Said rollers 12, 13 are rotated normally, and the covered wire 1 is moved forward for the specified distance from the cutting blades 37, 38, namely the length L1 having the covered lengths L3 and L4 at both ends; and then it is stopped. The drive unit 39 is operated under such a condition, and the covered wire 1 is cut by said both cutting blades 37, 38. Also, in this case, the covered wire 1 is placed in contact with the recessed part 37b of the blade part 37a of the fixed cutting blade 37 due to the rotation of the guiding mechanism 21 to the cutting position as in the case of the cutting of the cover described previously. Accordingly the covered wire 1 is never cut while it is bent at the front part of the guiding tube 23b.

The covered wire 1, which has been cut, located at the front side of both cutting blades 37, 38 is moved backward by the decortication length L4 of the rear end by reverse rotation of the upper and lower rollers 43, 42. Under this condition, the movable cutting blade 38 operates to cut only the cover 3.

Figure 7:
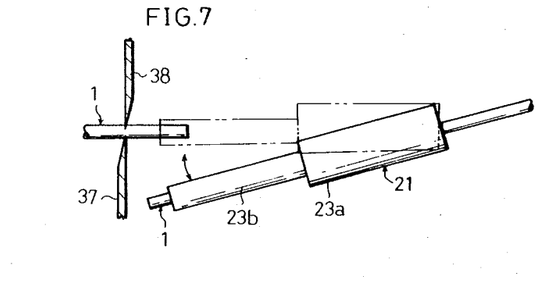
FIG. 7 is a plan view illustrating the inclined moving condition of the guiding member during the twisting of the covered wire.

With this timing, the covered wire 1 having been cut moves backward as long as the length L4 of decortication of the rear end. Therefore, it is constrained by the guiding member 23 and the covered wire 1 to be cut next on the locus of backward movement of covered wire 1 which has been cut. However, in this apparatus, said solenoid 26 is operated and said guiding tube 23b is rotated. Thereby, as illustrated in FIG. 7, it moves out of said locus and is moved outward from the regular transfer location of the covered wire. Accordingly, the guiding member 33 and covered wire 1 do not interfere with the backward movement of the covered wire 1 having been cut.

Thereafter, said upper and lower rollers 43, 42 are rotated normally, sending forward the covered wire 1. In synchronization with such normal rotation, the moving members 47 of said both rollers 42, 43 move in the opposed direction with each other in the thrust direction by the rotation of pulse motor 16. Thereby, as illustrated in FIG. 5, the covered wire 1 held between both rollers 42, 43 is moved forward and simultaneously twisted around the axial center. However, the cover of the rear end part of said covered wire 1 (the cover 2 of the part L4 illustrated in FIG. 10) is engaged with pressure with both cutting blades 37, 38 and can no longer be rotated. Accordingly, the core wire 2 at the length L4 for decortication at the rear end is decorticated while it is twisted with frictional resistance at the internal circumference of cover 2, and the core wire 2a at the rear end is twisted as illustrated in FIG. 11.

After completion of this process, the next covered wire 1 inserted into the guiding member 23 is shifted into the cutting mechanism 31. In this case, the solenoid 26 is demagnetized so that the covered wire 1 is not in contact with said fixed cutting blade 37; and the guiding member 23 is restored to the regular covered wire shifting position, namely almost at the intermediate position between both cutting blades 37, 38. Thus, cutting, decortication and twisting of a single covered wire are terminated.

The present invitation is not limited to said embodiment and for example, it can also be modified:

(1) In this embodiment, only one side (the rear end part) of the covered wire 1 is twisted, but both sides may certainly be twisted. In this case, the rollers 12, 13 of said sending/pulling mechanism 11 are moved in the thrust direction.

(2) In said embodiment, both fixed cutting blade 37 and movable cutting blade 38 are used. However, only movable cutting blades may also be used as these cutting blades. In this case, different from the preferred embodiment, it is no longer necessary that the covered wire 1 is placed in contact with the fixed cutting blade 37 during the cutting and decortication of covered wire 1.

(3) Said guiding mechanism 21 is rotated in the horizontal direction but it may also be rotated vertically or in an oblique direction and moverover, it may be moved parallel to the moving direction of the wire 1.

As described in detail, the present invention provides the effect that the covered wire may easily be cut and decorticated and also be twisted automatically in place of the manual processing in the related art. In addition, the present invention also provides such an excellent effect that working efficiency can be further improved remarkably because it is no longer necessary to make the covered wire move backward through reverse rotation of the sending/pulling rollers at the time of decorticating the rear end part of covered wire which has been cut.

Since it is apparent to form the embodiments including a variety of modifications in wider range without departing, the present invention is not restricted by the particular embodiments thereof unless otherwise specified in the appended claims.

What is claimed is:

1. An automatic, covered wire cutting and decorticating method comprising the steps of:
    (a) making a covered wire move by specified lengths toward one side of sending means of a cutting means disposed at a position opposed to said sending means, said wire moved by rotating a pair of rollers of said sending means,
    (b) cutting a cover of said covered wire by said cutting means,
    (c) pulling said covered wire to the sending means and decorticating the cover of said covered wire by rotating said rollers of said sending means, and
    (d) twisting an exposed core wire by relatively moving said rollers of said sending means in the axial center direction in synchronization with said step of pulling said covered wire.

2. An automatic, covered wire cutting and decorticating method according to claim 1, wherein said sending means is composed of a first sending means and a second sending means which are arranged opposed to each other on both sides of the cutting means, said decorticated covered wire is further moved by a specified length toward a side opposed to said second sending means of said cutting means by said first sending means after performing said steps (a) - (c) by said first sending means and said cutting means with said decorticated covered wire being cut by said cutting means after said processing steps, and the steps (a) to (c) are then carried out by said second sending means and cutting means and said step (d) is carried out by at least one of the first sending means and the second sending means.

3. An automatic, covered wire cutting and decorticating method according to claim 2 further comprising a step between said step (a) and step (b) accomplished by said second sending means and the cutting means, said further step moving the covered wire which is located between said first sending means and the cutting means and then cut and decorticated next to the outside of the locus of backward movement of said covered wire having been cut by means of covered wire guiding means provided between said first sending means and said cutting means.

4. An automatic, covered wire cutting and decorticating method according to claim 3, wherein said covered wire guiding means is moved to the outside of the locus of backward movement of the covered wire.

5. An automatic, covered wire cutting and decorticating method according to claim 1, wherein said cutting is formed by at least one cutting blade and further comprising a step for placing said covered wire in contact with said cutting blade by a covered wire guiding means provided between said sending means and said cutting means with said additional step located between said step (a) and step (b) and before the step for cutting the covered wire.

6. An automatic, covered wire cutting and decorticating apparatus comprising;
    (a) at least one sending means having a pair of rollers to move a covered wire,
    (b) cutting means which is provided at a position opposed to said sending means in order to cut said covered wire moved by a specified length from said sending means to a side not opposed to said sending means of the cutting means, said cutting means cutting a cover of the covered wire moved by a specified length from said sending means to the side not opposed to said sending means of said cutting means,
    (c) twisting means which is provided on said sending means for twisting an exposed core wire of said covered wire by relatively moving said pair of rollers in the axial center direction, and
    (d) control means for controlling the rotating directions of said rollers of said sending means and also selectively controlling said cutting means to achieve the condition for cutting off said covered wire and the condition for cutting said cover.

7. An automatic, covered wire cutting and decorticating apparatus according to claim 6, wherein said sending means comprises a first sending means and a second sending means which are arranged opposite to each other on both sides of the cutting means.

8. An automatic covered wire cutting and decorticating apparatus according to claim 7, further comprising a covered wire guiding means which is provided between said first sending means and said cutting means and is adapted to guide said covered wire to said cutting means.

9. An automatic, covered wire cutting and decorticating apparatus according to claim 8, wherein said cutting means comprises at least one cutting blade and position switching means is further provided for switching the position of said guiding means between a locus position of backward movement of the covered wire having been cut and the outside of the locus position of backward movement where the covered wire to be cut next is moved to the outside of the locus of backward movement of covered wire having been cut.

10. An automatic, covered wire cutting and decorticating apparatus according to claim 9, wherein said position switching means comprises;
    a regulating member which is fixed to the guiding means and is extended toward a guiding direction of the covered wire, said regulating member being integrally rotatable with said guiding means in the horizontal direction around the one end thereof and including at least one slot extending in the direction orthogonally crossing said guiding direction, and
    at least one solenoid which is extended in the same direction as the longitudinal direction of said slot, provided with a movable iron core having an engaging protrusion at the end part thereof and accomplishes position switching of said guiding means by insertion of said engaging protrusion into said slot and operation of the movable iron core.

11. An automatic covered wire cutting and decorticating apparatus according to claim 10, wherein said guiding means is adapted to be positioned at a covered wire cutting position where the covered wire guided from the guiding means is placed in contact with said cutting blade.

12. An automatic covered wire cutting and decorticating apparatus according to claim 11, wherein said solenoids and slots are respectively provided in pairs, said pair of slots are different in length and said guiding means is position-switched between said position outside the locus of backward movement and the covered wire cutting position by operating any one of said movable iron cores inserted into said slots.

13. An automatic, covered wire cutting and decorticating apparatus according to claim 6, wherein said twisting means is provided on said sending means and comprises a pair of moving members which are movable relatively in the direction of axial center of said rollers, a pair of racks provided to the external circumference of said both moving members, and a pair of pinions which are engaged with said both racks and move said both moving members in the opposite directions of axial center of the rollers.

14. An automatic covered wire cutting and decorticating apparatus according to claim 13, wherein said pair of racks are respectively provided, in the moving direction of the covered wire, to the side surface of the one moving member facing to said cutting means and the side surface of the other moving member not facing to said cutting means, and said pair of pinions are driven by a motor through a belt via a pair of axes.

15. An automatic covered wire cutting and decorticating method comprising the steps of:
(a) moving a covered wire by specified lengths toward cutting means using sending means for moving the wire,
(b) cutting a cover of said covered wire by said cutting means,
(c) pulling said covered wire to said sending means and decorticating the cover of said covered wire using said sending means, and
(d) twisting an exposed core wire by relatively moving a pair of moving means of said sending means in synchronization with said step of pulling said covered wire.

* * * * *